United States Patent
Raffaelli

(10) Patent No.: US 10,427,745 B2
(45) Date of Patent: Oct. 1, 2019

(54) FORECARRIAGE OF TILTING MOTOR VEHICLE AND MOTOR VEHICLE THEREOF

(71) Applicant: PIAGGIO & C. S.p.A., Pontedera, Pisa (IT)

(72) Inventor: Andrea Raffaelli, Pisa (IT)

(73) Assignee: PIAGGIO & C. S.p.A., Pontedera, Pisa (IT)

( * ) Notice: Subject to any disclaimer, the term of this patent is extended or adjusted under 35 U.S.C. 154(b) by 71 days.

(21) Appl. No.: 15/748,211

(22) PCT Filed: Jul. 28, 2016

(86) PCT No.: PCT/IB2016/054520
§ 371 (c)(1),
(2) Date: Jan. 29, 2018

(87) PCT Pub. No.: WO2017/017636
PCT Pub. Date: Feb. 2, 2017

(65) Prior Publication Data
US 2018/0265155 A1 Sep. 20, 2018

(30) Foreign Application Priority Data

Jul. 29, 2015 (IT) .................. 102015000039551

(51) Int. Cl.
*B62K 5/10* (2013.01)
*B62K 5/08* (2006.01)
(Continued)

(52) U.S. Cl.
CPC .............. *B62K 5/10* (2013.01); *B62D 9/02* (2013.01); *B62D 9/04* (2013.01); *B62K 5/01* (2013.01);
(Continued)

(58) Field of Classification Search
CPC ............... B62D 9/02; B62K 5/10; B62K 5/08
See application file for complete search history.

(56) References Cited

U.S. PATENT DOCUMENTS

| | | | | | |
|---|---|---|---|---|---|
| 4,550,926 A | * | 11/1985 | MacIsaac | ................. | B60G 3/18 280/124.103 |
| 4,887,829 A | * | 12/1989 | Prince | .................... | B60G 21/05 280/282 |

(Continued)

FOREIGN PATENT DOCUMENTS

| EP | 3144164 A1 | * | 3/2017 | ............. B62K 25/16 |
|---|---|---|---|---|
| JP | 2016175438 A | * | 10/2016 | ............... B62D 9/02 |

(Continued)

*Primary Examiner* — Nicole T Verley
(74) *Attorney, Agent, or Firm* — Arent Fox LLP; Michael Fainberg

(57) ABSTRACT

A motor vehicle forecarriage comprises a forecarriage frame, a pair of front wheels kinematically connected to the forecarriage frame by means of an articulated quadrilateral, said articulated quadrilateral comprising a pair of cross members, hinged to the forecarriage frame in correspondence of middle hinges, said cross members being connected together, in correspondence of opposite transverse ends, by means of uprights pivoted to said transverse ends in correspondence of side hinges, the cross members and the uprights defining said articulated quadrilateral. Each of the uprights guides and supports a stub axle of a front wheel, each upright extending from an upper end to a lower end, wherein the left and right uprights rotatably support the left and right front wheels, respectively, around respective steering axes parallel to each other.

29 Claims, 15 Drawing Sheets

(51) Int. Cl.
  *B62D 9/02*   (2006.01)
  *B62K 5/01*   (2013.01)
  *B62K 5/027*  (2013.01)
  *B62D 9/04*   (2006.01)
  *B62K 5/05*   (2013.01)
  *B62L 1/00*   (2006.01)
  *B62K 5/00*       (2013.01)
  *B62D 7/20*       (2006.01)

(52) U.S. Cl.
  CPC ............... *B62K 5/027* (2013.01); *B62K 5/05* (2013.01); *B62K 5/08* (2013.01); *B62L 1/00* (2013.01); *B62D 7/20* (2013.01); *B62K 2005/001* (2013.01)

(56) References Cited

U.S. PATENT DOCUMENTS

| | | | | |
|---|---|---|---|---|
| 5,762,351 A * | 6/1998 | SooHoo | ............... | B60G 21/007 180/210 |
| 7,377,522 B2 * | 5/2008 | MacIsaac | ............... | B60G 3/01 280/5.506 |
| 7,487,985 B1 * | 2/2009 | Mighell | ............... | B62K 5/027 180/210 |
| 7,568,541 B2 * | 8/2009 | Pfeil | ............... | B60G 21/007 180/210 |
| 7,571,787 B2 * | 8/2009 | Saiki | ............... | B60G 7/00 180/210 |
| 7,850,180 B2 * | 12/2010 | Wilcox | ............... | B60G 7/008 180/210 |
| 8,123,240 B2 * | 2/2012 | Mercier | ............... | B62D 9/02 280/124.103 |
| 8,419,027 B2 * | 4/2013 | Ting | ............... | B62K 5/02 280/124.103 |
| 8,814,186 B1 * | 8/2014 | Rinda | ............... | B62K 5/06 280/93.504 |
| 8,818,700 B2 * | 8/2014 | Moulene | ............... | G05D 1/0891 180/199 |
| 9,037,347 B2 * | 5/2015 | Hayashi | ............... | B60G 17/015 313/146 |
| 9,216,790 B2 * | 12/2015 | Takano | ............... | B60G 17/005 |
| 9,296,420 B2 * | 3/2016 | Sasaki | ............... | B62J 15/00 |
| 9,340,249 B2 * | 5/2016 | Takano | ............... | B62K 21/00 |
| 9,527,543 B2 * | 12/2016 | Mercier | ............... | B62K 5/05 |
| 9,545,967 B2 * | 1/2017 | Takano | ............... | B62K 21/00 |
| 9,586,642 B2 * | 3/2017 | Mori | ............... | B62K 5/10 |
| 9,688,339 B2 * | 6/2017 | Hirayama | ............... | B62K 5/05 |
| 9,725,130 B2 * | 8/2017 | Takano | ............... | B62K 5/05 |
| 9,776,680 B2 * | 10/2017 | Hirakawa | ............... | B62K 5/05 |
| 9,855,807 B2 * | 1/2018 | Mori | ............... | B60G 3/26 |
| 9,981,708 B2 * | 5/2018 | Ohno | ............... | B62K 5/027 |
| 2004/0140645 A1 * | 7/2004 | Hayashi | ............... | B62K 5/05 280/282 |
| 2006/0151232 A1 * | 7/2006 | Marcacci | ............... | B60G 21/007 180/414 |
| 2007/0029751 A1 * | 2/2007 | Marcacci | ............... | B62D 9/02 280/124.1 |
| 2011/0275256 A1 * | 11/2011 | Gibbs | ............... | B60F 3/0007 440/12.51 |
| 2012/0181768 A1 * | 7/2012 | MacIsaac | ............... | B60G 3/01 280/124.103 |
| 2015/0197304 A1 * | 7/2015 | Kroening, Jr. | ............... | B62K 13/04 180/209 |
| 2018/0222527 A1 * | 8/2018 | Raffaelli | ............... | B62D 9/02 |
| 2018/0237094 A1 * | 8/2018 | Fischer | ............... | B62K 5/06 |
| 2018/0265156 A1 * | 9/2018 | Hara | ............... | B62D 5/046 |
| 2018/0327044 A1 * | 11/2018 | Raffaelli | ............... | B62K 5/06 |

FOREIGN PATENT DOCUMENTS

WO        2013/005007 A     1/2013
WO     WO-2019060966 A1 *   4/2019  ............... B60G 3/01

\* cited by examiner

# FORECARRIAGE OF TILTING MOTOR VEHICLE AND MOTOR VEHICLE THEREOF

CROSS-REFERENCE TO RELATED APPLICATIONS

This application is the U.S. National Stage Application of International Patent Application No. PCT/IB2016/054520, filed on Jul. 28, 2016, which claims priority to Italian Patent Application No. 102015000039551, filed on Jul. 29, 2015, the contents of each of which is incorporated herein by reference in its entirety.

FIELD OF APPLICATION

The present invention relates to a forecarriage of a tilting motor vehicle and a motor vehicle thereof.

STATE OF THE ART

As is known, three-wheeled motor vehicles exist in the art with a rear drive wheel and two steering and tilting wheels. i.e. rolling or inclining, at the front.

Therefore, the rear wheel is intended to provide torque and thus allow traction while the front wheels, paired, are intended to provide the directionality of the vehicle.

Using two front wheels, instead of two rear wheels, avoids the use of a differential for torque transmission. This way a reduction of costs and weights at the rear axle can be achieved.

The paired wheels at the forecarriage in addition to steering, can tilt and roll: this way, compared with the three-wheeled vehicles with two wheels at the rear axle, vehicles with two wheels at the forecarriage are equivalent to an actual motorbike since, just like a motorbike, the vehicle is able to tilt when cornering.

Compared to a motor vehicle with only two-wheels, such vehicles with two paired wheels on the forecarriage have however a greater stability ensured by the dual resting on the ground of the front wheels, similar to that provided by a car.

The front wheels are kinematically connected to each other by means of kinematic mechanisms which enable the same to roll and/or steer synchronously and in a specular manner for example through the interposition of articulated quadrilaterals.

As regards the steering angle of the front wheels, it is also possible to provide for different steering angles between the front wheels, for example if you take a car type steering, where the outer wheel remains more open when cornering.

Tilting three-wheeled motor vehicles are thus designed to provide the user with the handling of a two-wheel motorcycle and, at the same time, the stability and safety of a four-wheeled vehicle.

In fact the two predefined goals are antithetical since greater stability requires the presence of additional elements compared to a two-wheeled motor vehicle (such as the third wheel and its relative kinematic mechanisms) which inevitably weigh down the structure of the vehicle.

Moreover, the presence of 'only' three wheels cannot per force guarantee the stability and roadholding of a four-wheeled vehicle.

Therefore, it is essential to develop a three-wheeled vehicle that can mediate these antithetical objectives, while ensuring stability and handling, as well as reliability and low costs.

In addition, the steering system of such vehicle with two steering front wheels is particularly problematic given that in such type of vehicle it is important to decouple the steering motion from the springing motion or vertical bumping of the wheels. In fact, if the steering motion and the motion of the wheels were coupled, situations could occur in which the wheel planes, each passing through a wheel centreline, could diverge, losing their parallelism, for example, due to a different springing motion of the wheels (for example due to an obstacle or asymmetrical depression or encountered by only one of the two wheels).

In addition this coupling of the steering motion with the springing motion or vertical bumping of the wheel could lead to a spin on the steering control while keeping the wheel planes parallel to each other in case of symmetrical springing between the front wheels.

The two aforementioned situations of divergence between the wheel planes or steering reactions with parallel wheel planes, both due to the coupling between the steering motion and the springing motion or vertical bumping of the wheels, are negative for the dynamic behaviour of the vehicle.

In fact, the divergence between the wheel planes makes the directionality of the vehicle set by the steering angle of the handlebar less precise, while the transmission of the wheel reactions (albeit parallel to each other) to the handlebar, gives a feeling of poor handling and steering precision to the driver, as well as inducing, in some cases, inadvertent steering with relative unwanted swerving.

To achieve such purposes a specific geometry of the front portion of the frame or forecarriage must be developed, responsible for supporting the front wheels in their steering and rolling or tilting movement, as well as a specific geometry of the steering members of the front wheels.

PRESENTATION OF THE INVENTION

To resolve the aforesaid problems, to date many solutions have been adopted in the art of three-wheeled vehicles, of which two on the forecarriage.

Such solutions of the prior art fail to optimise the need for stability and handling described above.

The need is therefore felt to resolve the drawbacks and limitations mentioned with reference to the prior art.

This requirement is satisfied by a motor vehicle forecarriage according to claim 1 and by a motor vehicle according to claim 27.

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1:
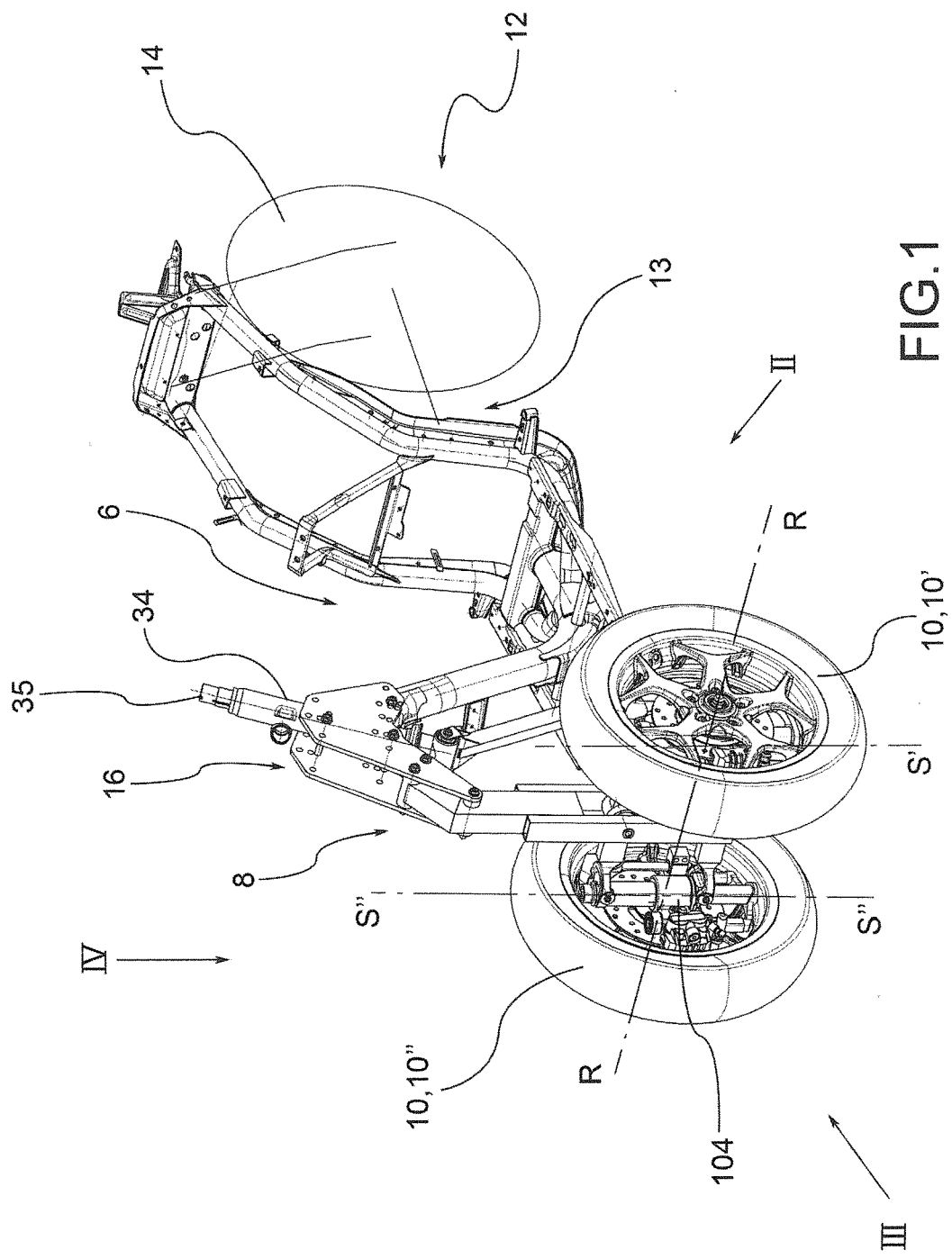
FIG. 1 is a partial perspective view of a motor vehicle comprising a forecarriage according to the present invention.
Figure 2:
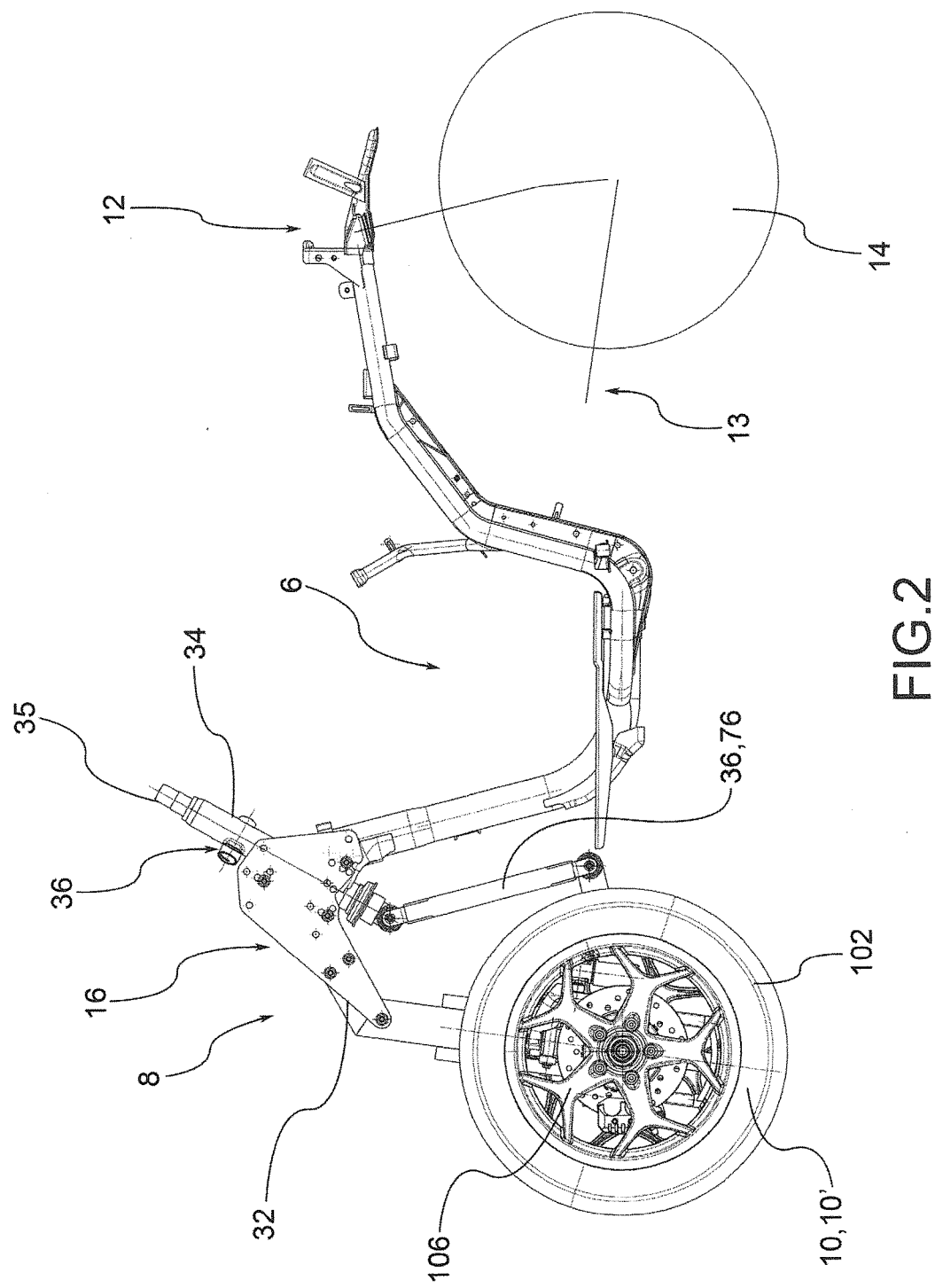
FIG. 2 shows a side view of the motor vehicle in FIG. 1 from the side of the arrow II in FIG. 1.
Figure 3:
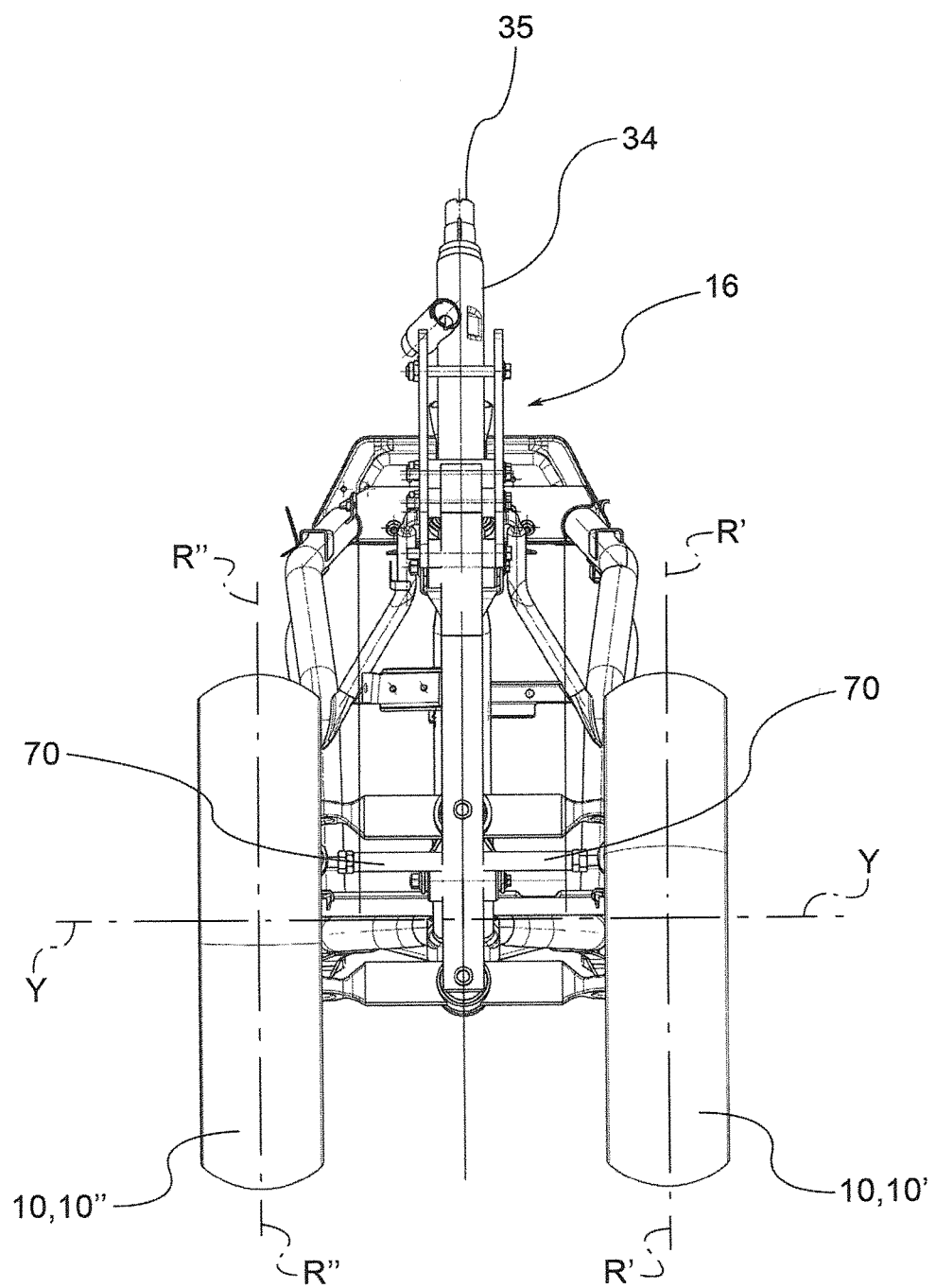
FIG. 3 shows a front view of the motor vehicle in FIG. 1 from the side of the arrow III in FIG. 1.
Figure 4:
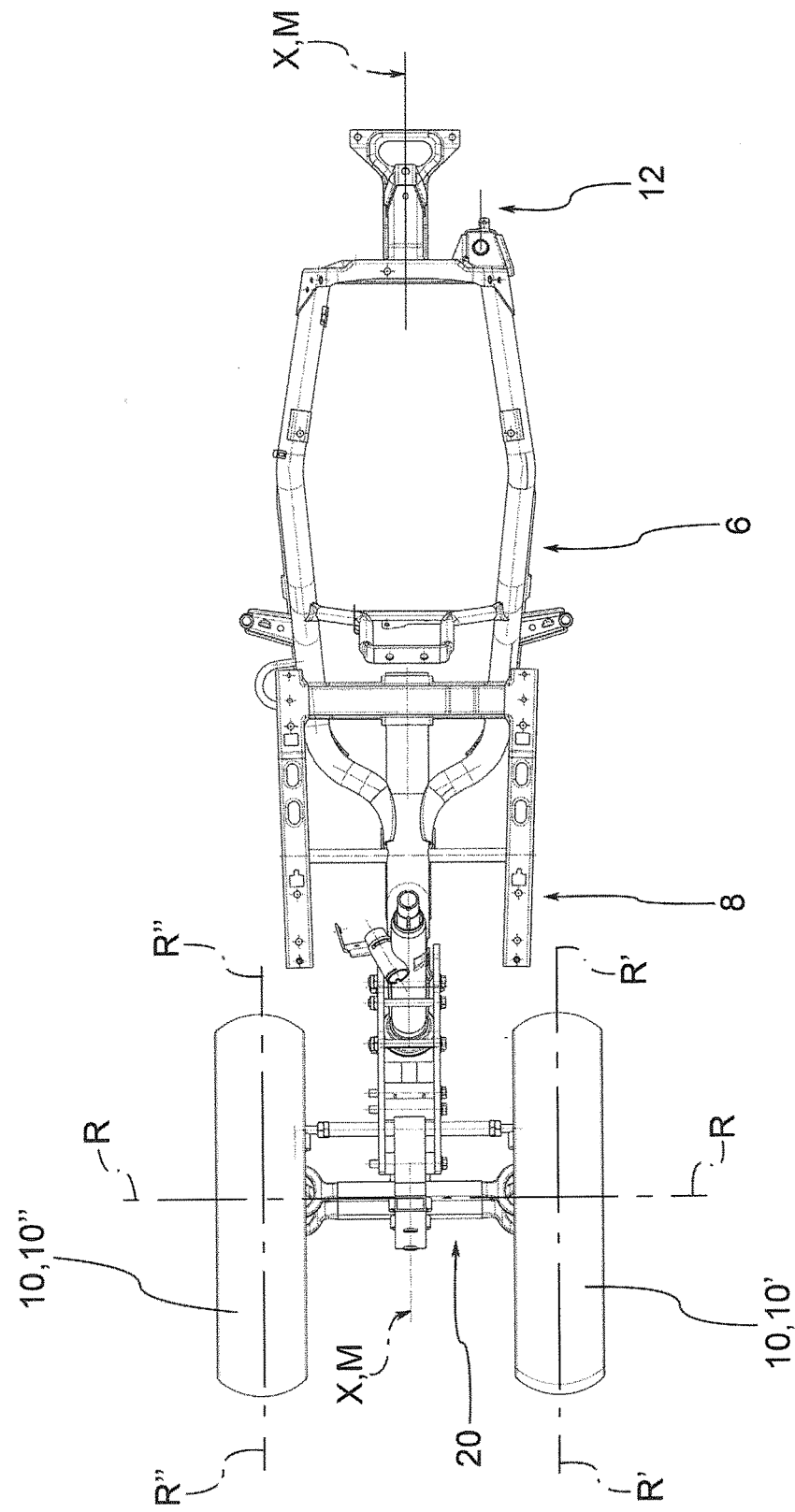
FIG. 4 shows a plan view of the motor vehicle in FIG. 1 from the side of the arrow IV in FIG. 1.
Figure 5:
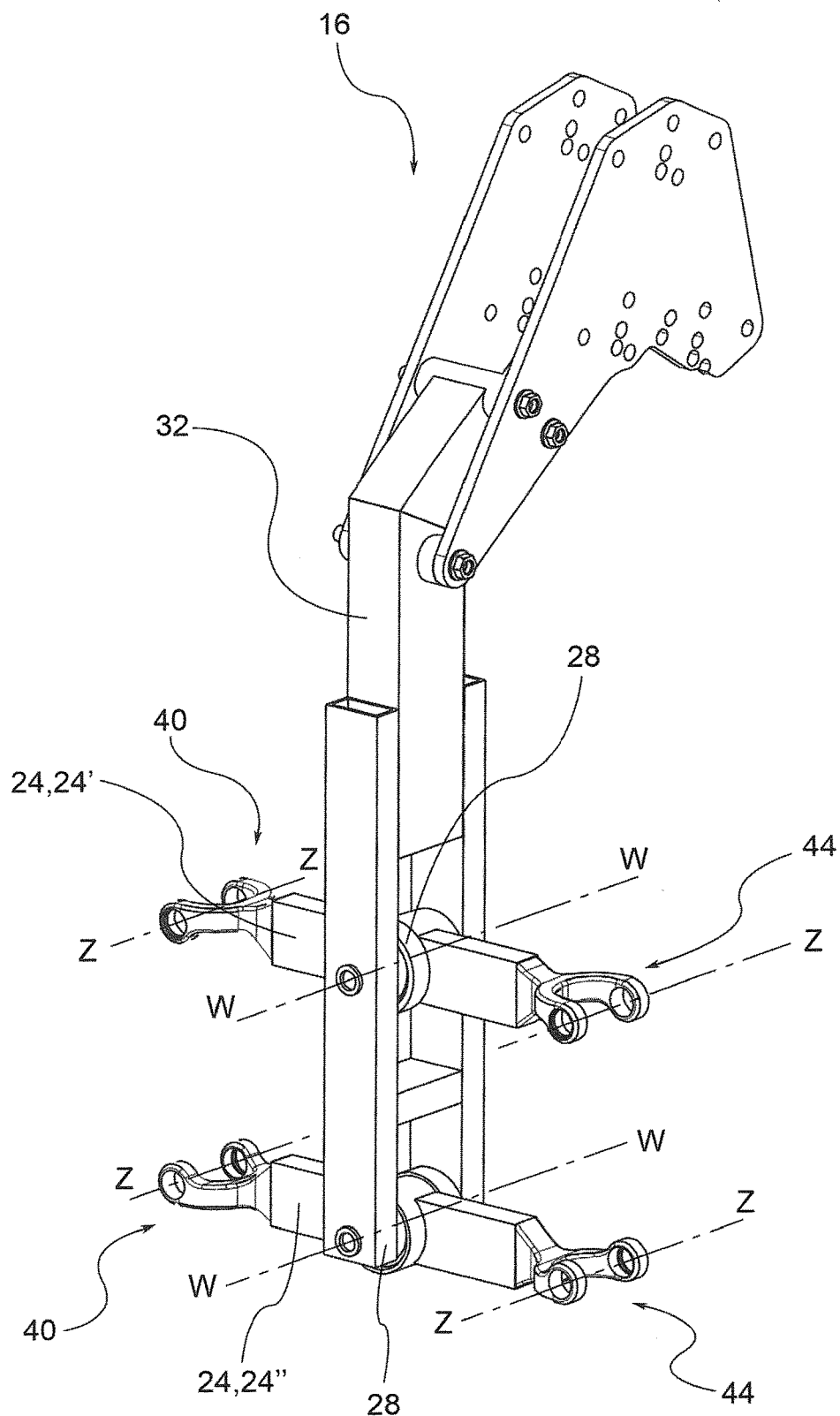
FIGS. 5-6 show partial perspective views of motor vehicle forecarriages according to the present invention.
Figure 6:
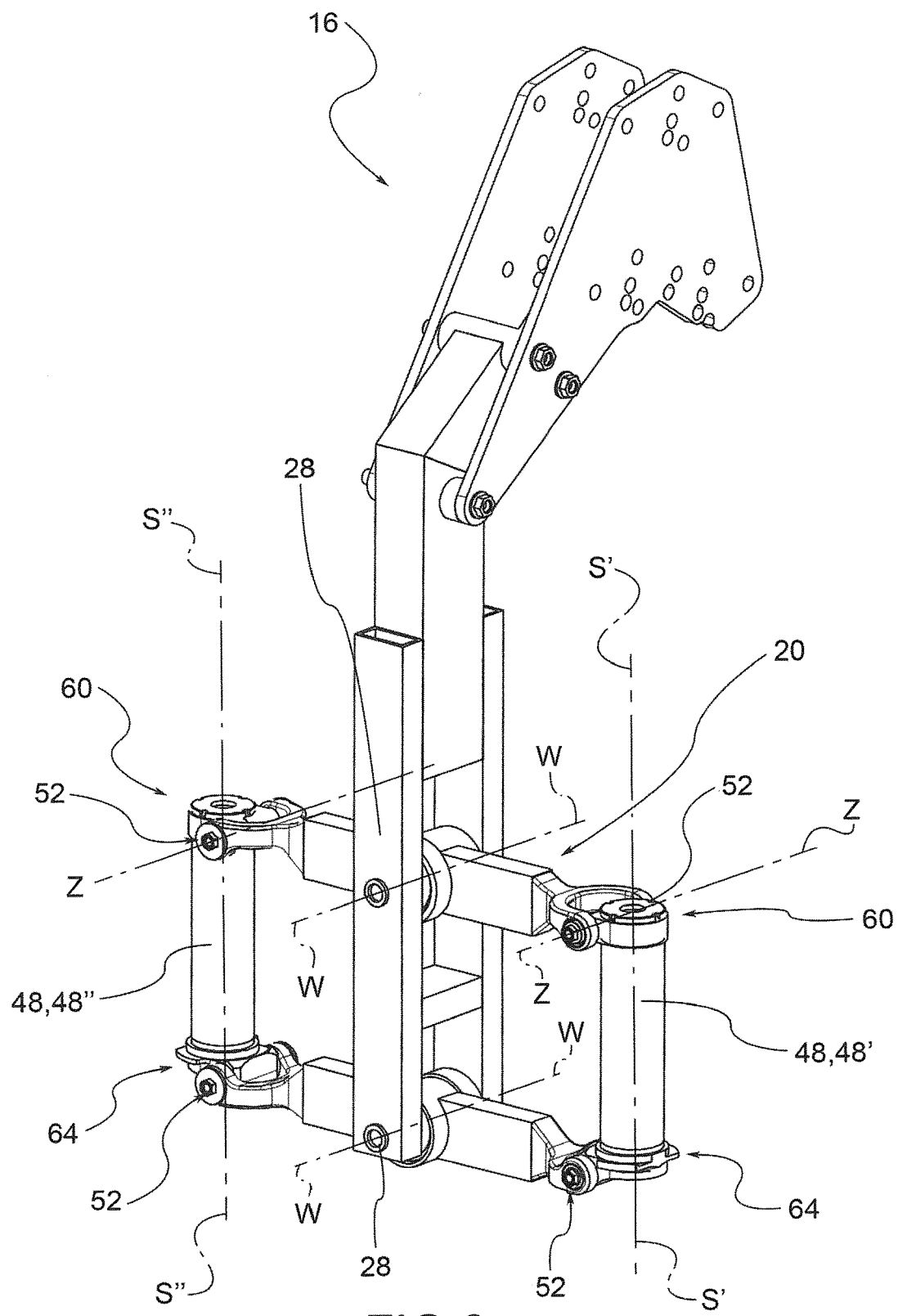
Figure 7A:
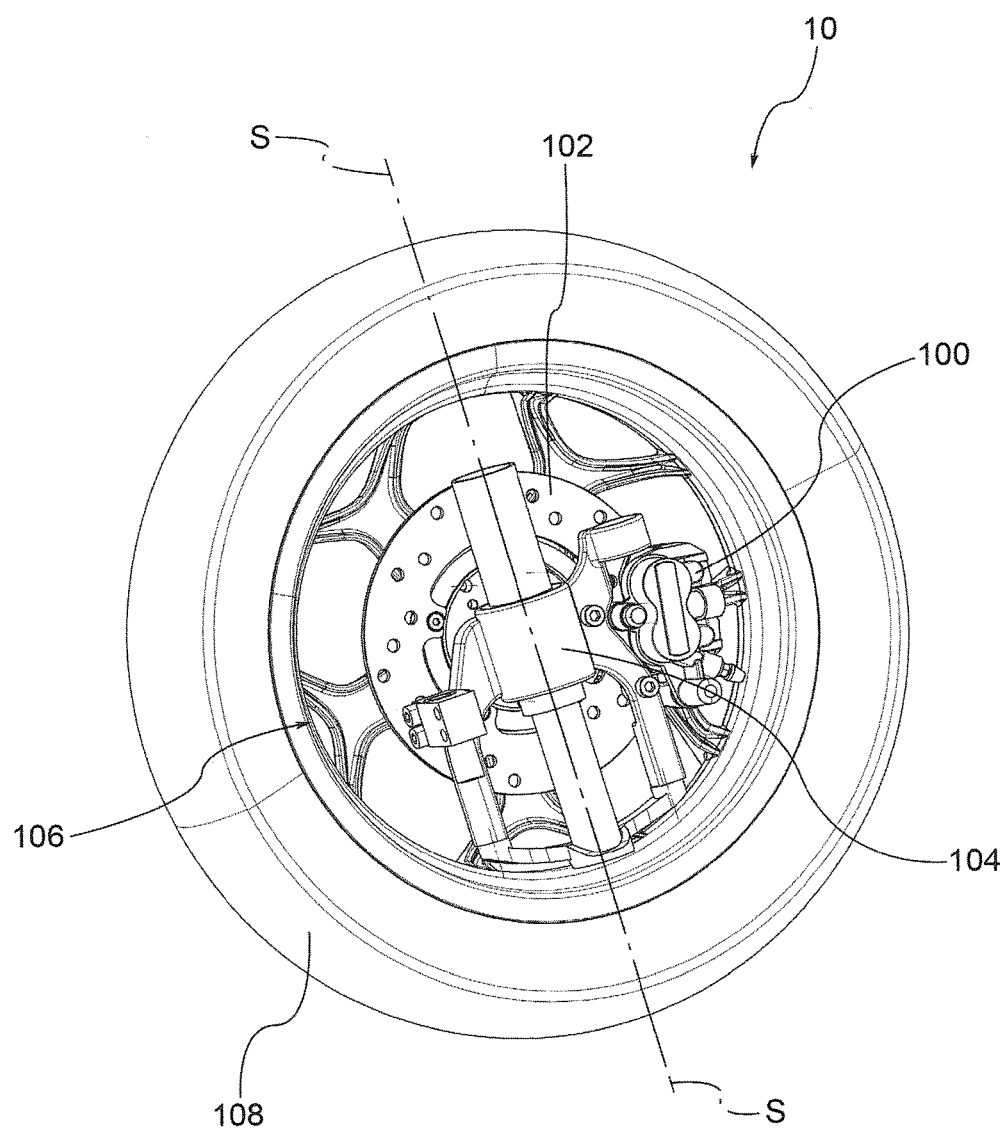
FIG. 7a shows a partial perspective view of a wheel of the motor vehicle according to the present invention.
Figure 7B:
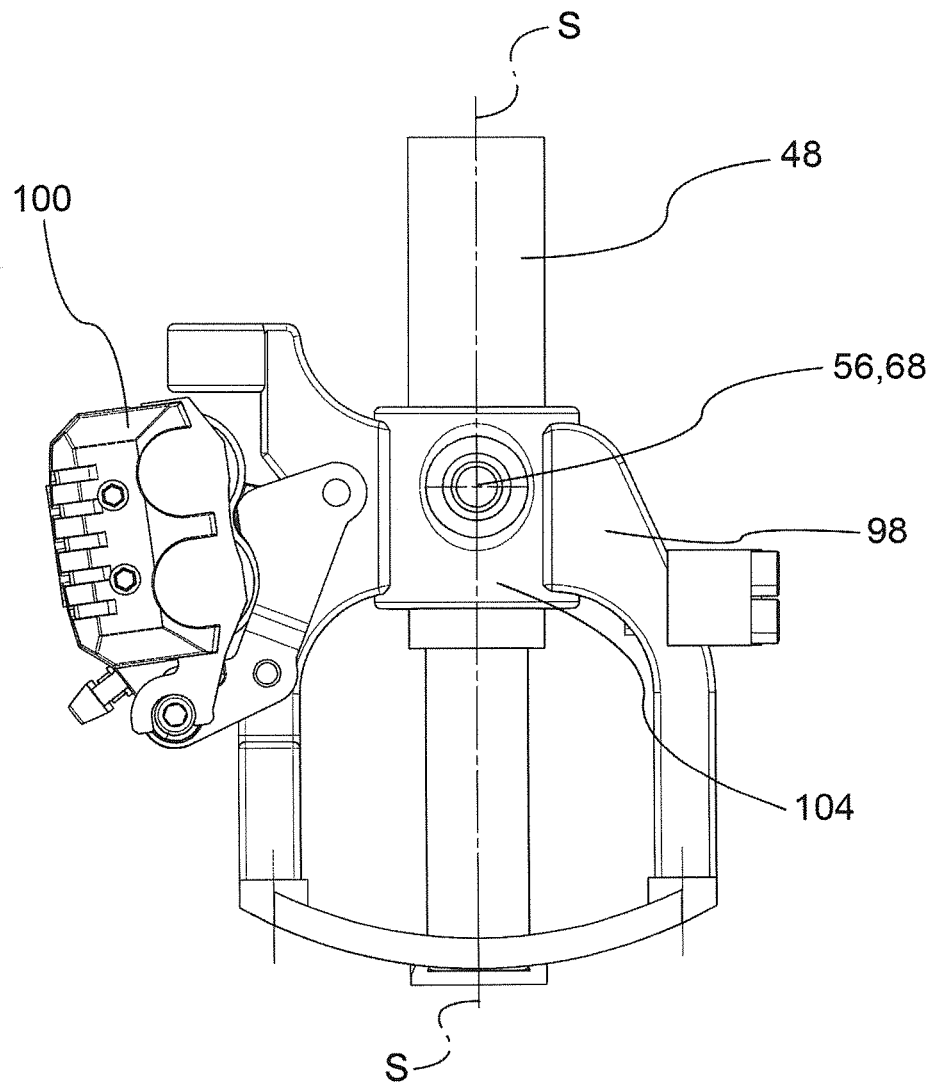
FIG. 7b shows a partial side view of components of a motor vehicle forecarriage according to the present invention.
Figure 8A:
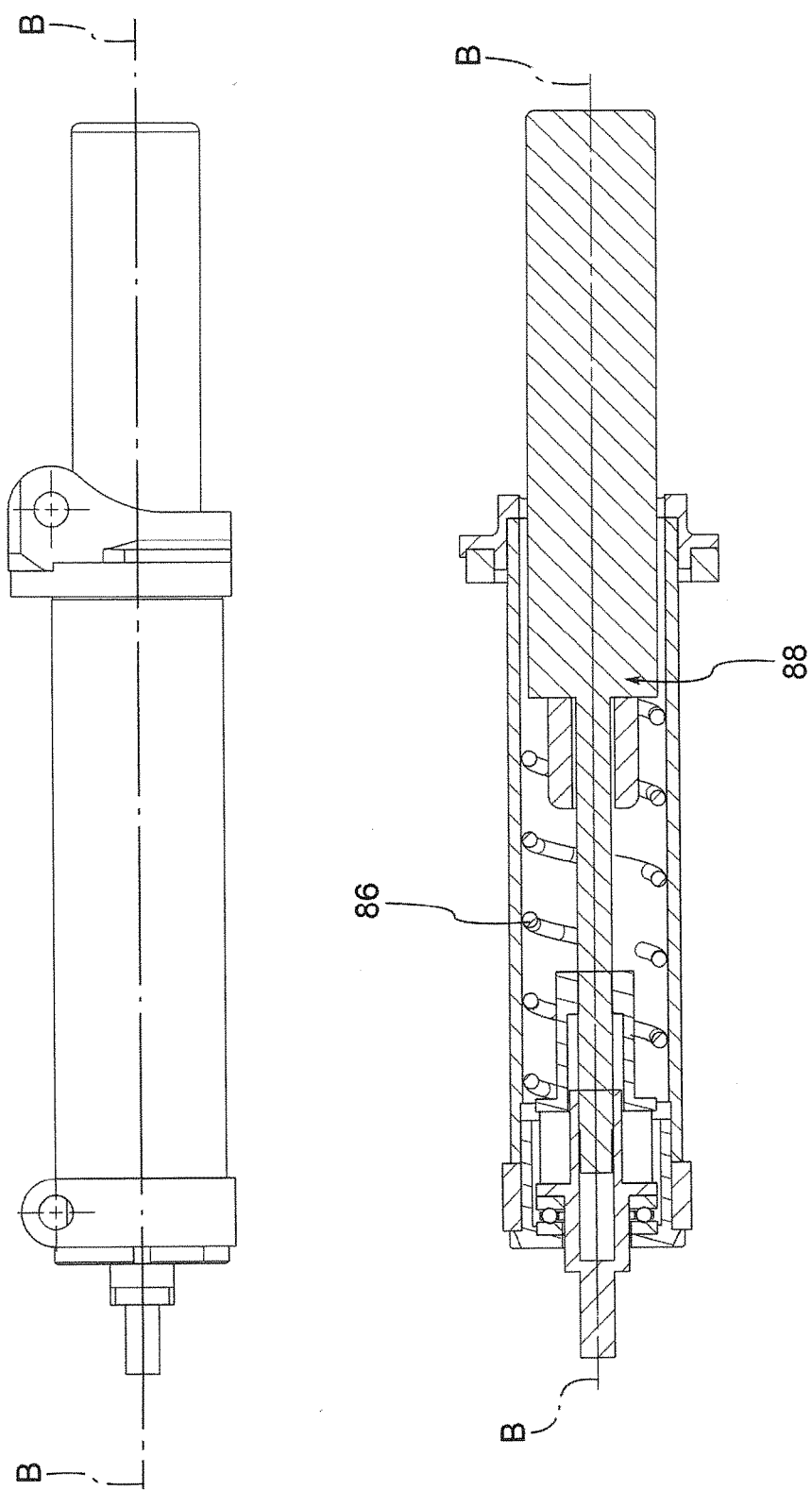
FIG. 8a shows a perspective view in cross-section of a suspension applied to a motor vehicle according to the present invention.
Figure 8B:
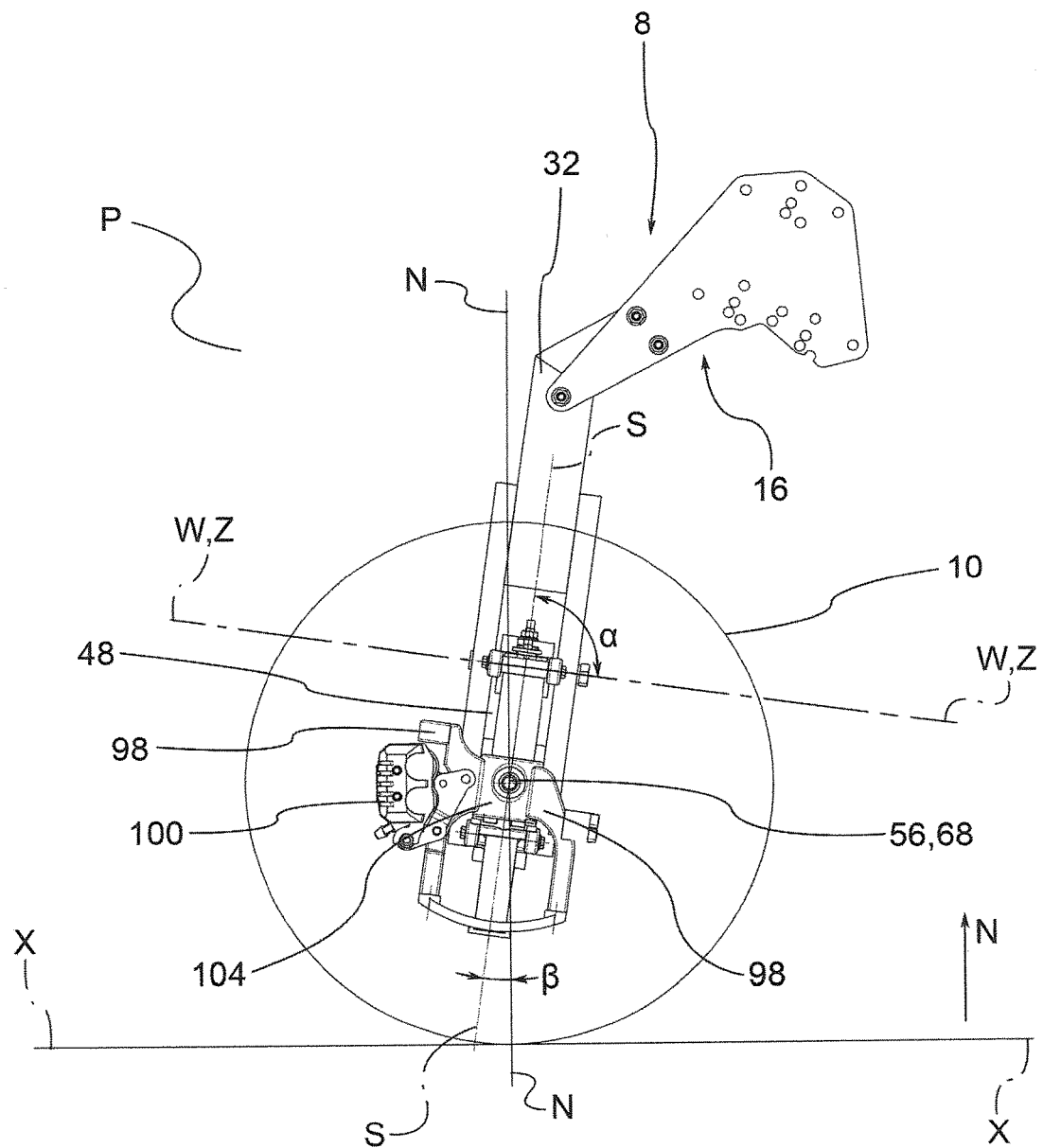
FIG. 8b shows a partial side view of components of a motor vehicle forecarriage according to the present invention.
Figure 9:
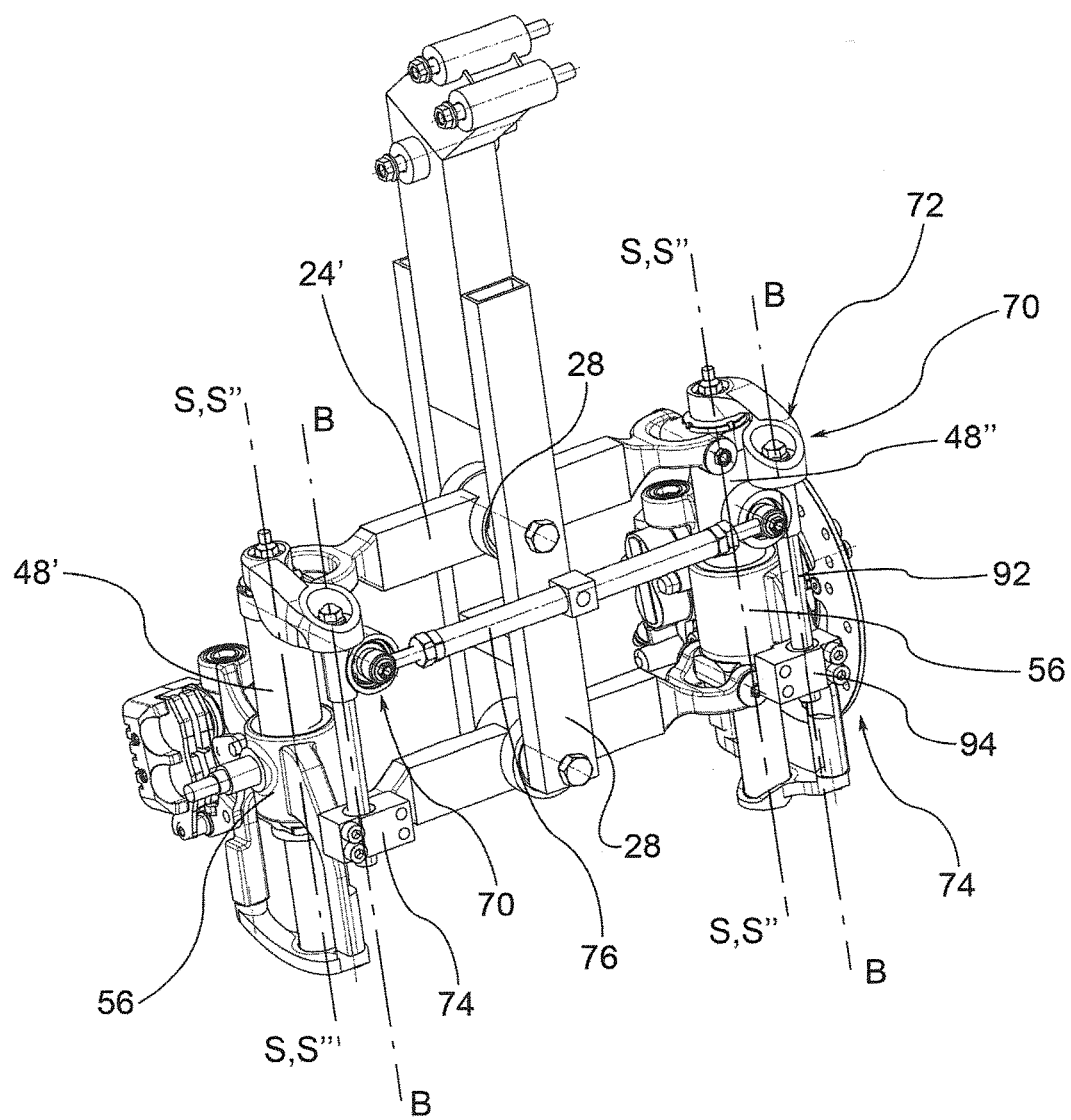
FIGS. 9, 10a, 10b show partial perspective views, of a forecarriage comprising steering tie-rods according to one embodiment of the present invention.
Figure 10A:
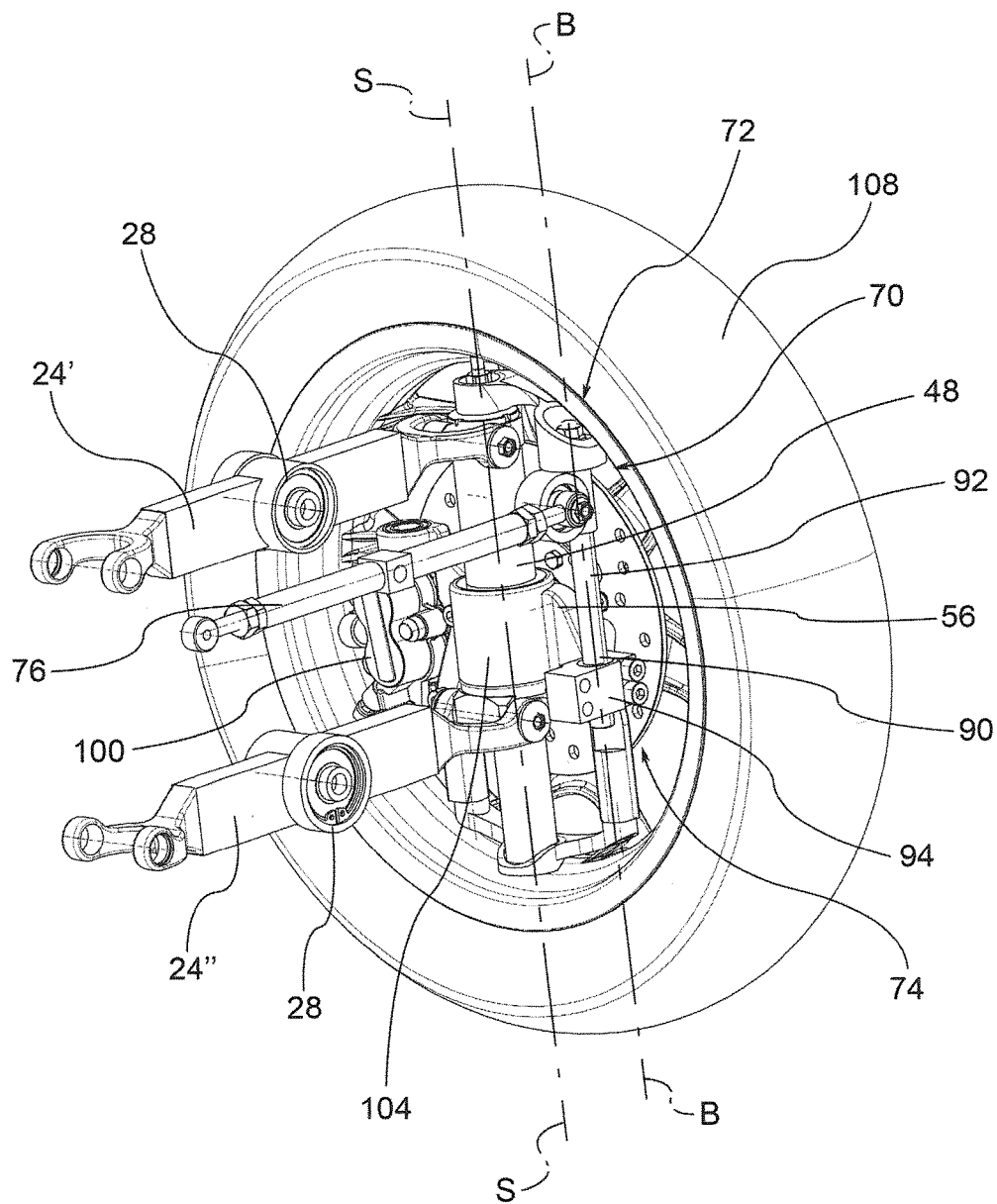
Figure 10B:
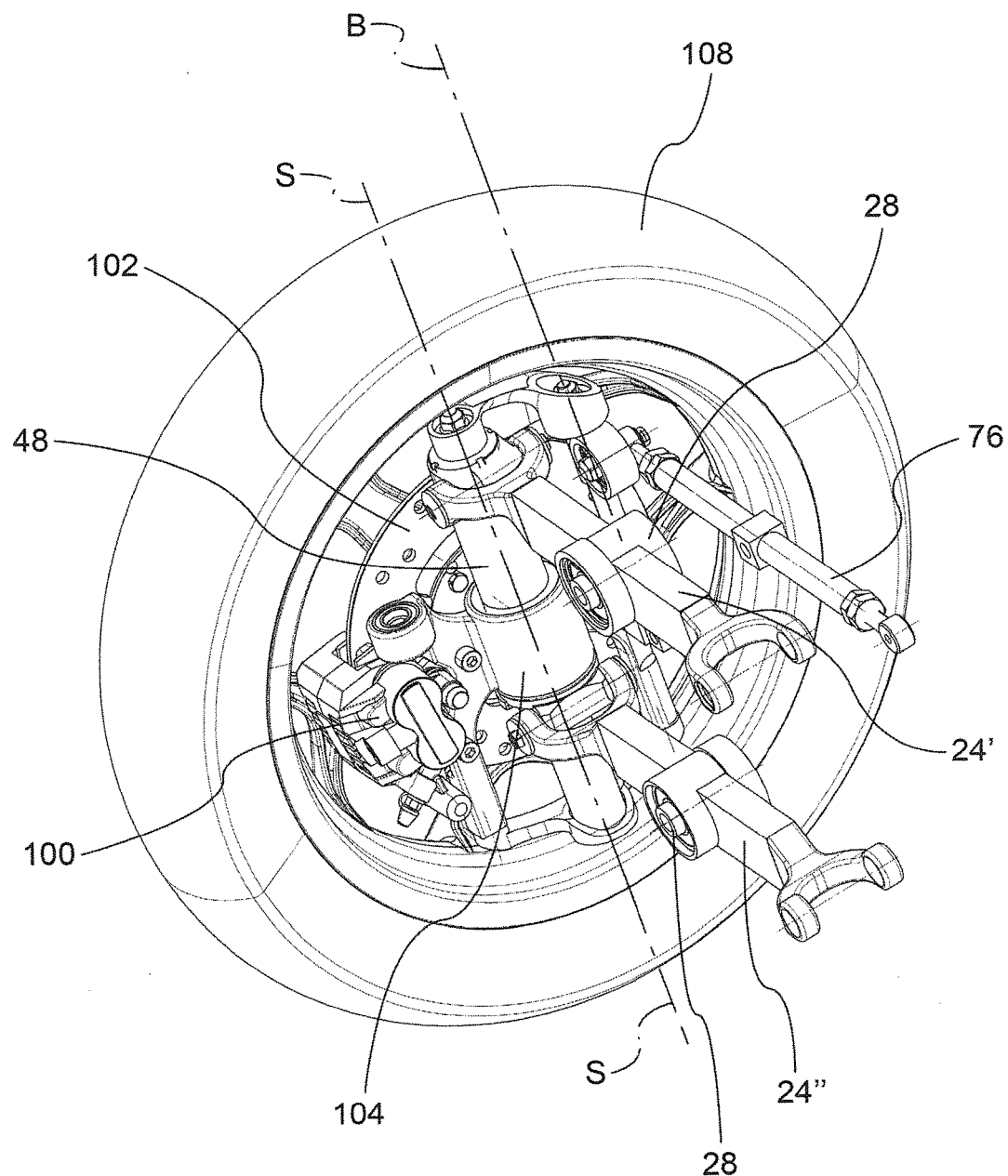
Figure 11:
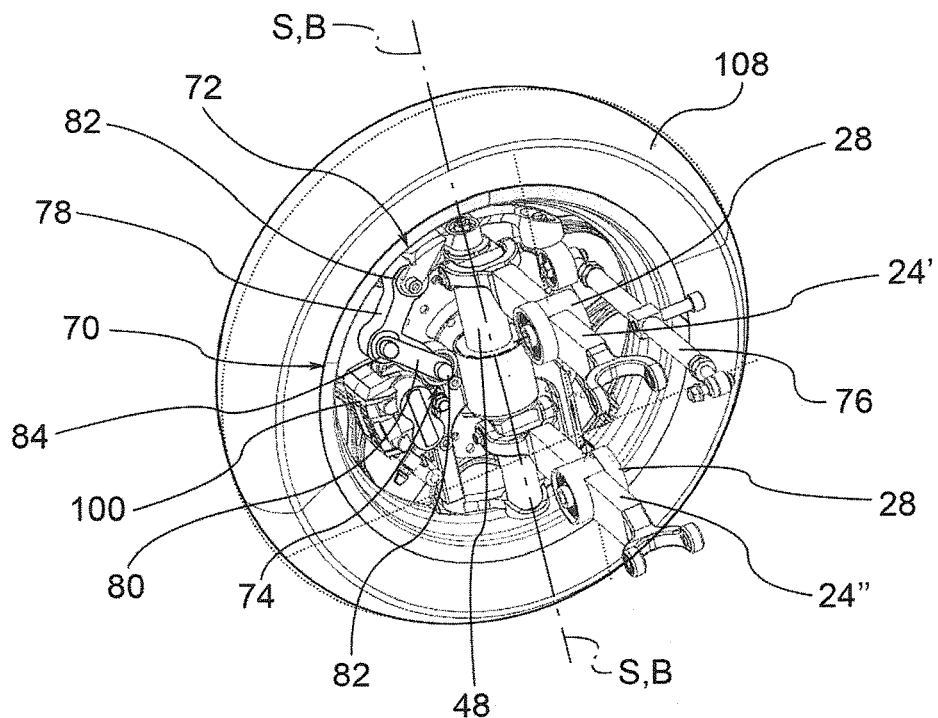
FIGS. 11, 12a, 12b show partial perspective views of forecarriages comprising steering tie-rods according to further embodiments of the present invention.

With reference to the aforementioned figures, reference numeral 4 globally denotes a schematic overall view of a motor vehicle according to the present invention.

For the purposes of the present invention, it should be pointed out that the term motor vehicle should be considered in a broad sense, encompassing any motor cycle having at least three wheels, i.e. two aligned wheels, as described better below and at least one rear wheel. Such definition therefore also comprises so-called quad bikes having two wheels on the forecarriage and two wheels on the rear axle.

The motor vehicle 4 comprises a frame 6 extending from a forecarriage 8 supporting at least two front wheels 10, to a rear axle 12 supporting one or more rear wheels 14. It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and' to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth.

The frame 6 of the motor vehicle can be in one piece or in multiple parts; for example the frame 6 of the motor vehicle interconnects with a rear axle frame 13 which may comprise an oscillating rear fork (not shown) which supports one or more rear drive wheels 14.

Said rear oscillating fork may be connected to the frame 6 by direct hinging, or by the interposition of a lever mechanism and/or intermediate frames.

The motor vehicle forecarriage 8 comprises a forecarriage frame 16 and a pair of front wheels 10 kinematically connected to the forecarriage frame 16 by means of an articulated quadrilateral 20.

The articulated quadrilateral 20 comprises a pair of cross members 24,24',24", hinged to the forecarriage frame 16 in correspondence of middle hinges 28.

The middle hinges 28 identify middle hinge axes W-W parallel to each other.

For example said middle hinges are fitted on a front beam 32, positioned to straddle a centreline plane M-M passing through a longitudinal direction X-X or the direction of travel of the motor vehicle.

For example, a steering mechanism 36, connected to a handlebar (not shown) of the motor vehicle 4, is pivoted on a steering column 34 inserted so as to swivel in a steering tube 35 of the frame 6 of the motor vehicle 4.

The cross members 24 extend in a main transverse direction Y-Y between opposite transverse ends 40,44.

In particular, said cross members 24 are connected together, in correspondence of said opposite transverse ends 40, 44, by means of uprights 48, 48', 48" pivoted to said transverse ends 40, 44 in correspondence of side hinges 52.

In one embodiment, the cross members 24, 24', 24" are mounted cantilevered with respect to the front beam 32.

The cross members 24 and the uprights 48 define said articulated quadrilateral 20. In particular the quadrilateral comprises two cross members 24, i.e. a top cross member 24' and a bottom cross member 24", in which the top cross member is facing the side of the associable handlebar and the bottom cross member 24" is facing towards the ground supporting the motor vehicle.

The cross members are not necessarily the same as each other in terms of shape, materials and size; each cross member 24 can be made in one piece or in two or more parts mechanically attached, for example by welding, bolts, rivets and similar.

There are two uprights 48, in particular a left upright 48' and a right upright 48".

The definition of left and right upright 48', 48" is purely formal and means in relation to a driver of the vehicle. Said left and right uprights 48', 48" are arranged to the left and right of a centreline plane M-M of the motor vehicle, compared to a point of observation of a driver driving it.

The side hinges 52 are parallel to each other and define respective side hinge axes Z-Z.

Preferably, said middle 28 and side hinges 52 are oriented according to middle W-W and side Z-Z hinge axes parallel to each other.

The left and right uprights 48', 48" rotatably support the left and right front wheels 10', 10", respectively, around respective steering axes S'-S', S"-S". Said steering axes S'-S', S"-S" are parallel to each other.

According to a possible embodiment, the hinges 28 and 52 are parallel to each other and perpendicular to said steering axes S'-S', S"-S". In other words, according to one embodiment, compared to a projection plane P passing through said middle hinges 28, the steering axes S'-S', S"-S" identify with the middle W-W and side hinge axes an angle α of 90 degrees.

According to possible embodiments, said angle α is between 80 and 120 degrees and preferably said angle α is between 90 and 110 degrees; even more preferably said angle value α is equal to 100 degrees.

The steering axes S'-S', S"-S" with respect to said projection plane P, may be inclined by a steering angle β between 5 and 20 degrees, and preferably between 8 and 16 degrees with respect to a vertical direction N-N, perpendicular to the ground.

According to further embodiments, it is also possible to provide that the hinges 28 and 52 are tilted according to middle W-W and side hinge axes Z-Z side parallel to the ground, i.e. perpendicular to said vertical direction N-N with respect to said projection plane P: in this configuration, said angle β is equal to 0 degrees.

Furthermore, as seen, it is also possible to provide that the hinges 28 and 52 are not perpendicular to the steering axes S'-S', S"-S": in fact, as described above, said angle α, defined between the steering axes S'-S', S"-S' and the middle W-W and side hinges Z-Z with respect to a projection plane P passing through said middle hinges 28, is comprised between 90 and 110 degrees; even more preferably said angle α value is equal to 100 degrees.

The parallelism to the ground of the middle W-W and side hinge axes Z-Z means that, in the rolling motion, the inner wheel with respect to the curve rises upwards almost vertically with the double advantage of uncoupling the rolling motion of the wheel from horizontal braking forces (transmitted from the ground) and of taking up less space towards the bottom of the motor vehicle.

It should be noted that, by tilting the middle W-W and side axes Z-Z with respect to the steering axes S'-S', S"-S", so that in static conditions at rest said middle W-W and side hinge axes Z-Z are parallel to the ground, in braking conditions, and therefore compression of the suspensions of the front wheels 10', 10' said middle W-W and side hinge axes Z-Z are inclined moving into a condition of substantial parallelism to the ground. For example, if in static conditions the middle W-W and side hinge axes Z-Z identify an angle β different from zero with the horizontal direction (which coincides with the angle formed with the vertical direction, which is perpendicular to the horizontal direction), in braking and maximum compression conditions this angle tends to zero.

When, during braking, the middle W-W and side hinge axes Z-Z are arranged substantially parallel to the ground, the jumping of the wheels is avoided since the braking forces, horizontal and therefore parallel to the ground, do not produce components along the excursion movement of the wheels which is practically perpendicular to the ground, i.e. vertical.

Each of the uprights 48, 48', 48" guides and supports a stub axle 56 of a front wheel 10,10', 10"; each upright 48 extends from an upper end 60 to a lower end 64. The top end 60 is facing towards the upper cross member 24' and the lower end 64 is facing the bottom cross member 24".

The left and right uprights 48', 48" rotatably support the left and right front wheels 10', 10", respectively, around respective steering axes S'-S', S"-S" parallel to each other.

Each stub axle 56 is mechanically connected to a rotation pin 68 of a front wheel 10', 10" so as to rotatably support the front wheel 10', 10" around a related rotation axis R-R.

According to one embodiment, each rotation pin 68 of the front wheel 10', 10" is comprised between the upper end 60 and the lower end 64 of the corresponding upright 48, 48', 48" of the articulated quadrilateral 20.

According to one embodiment, each rotation pin 68 of each front wheel 10 is comprised between adjacent side hinges 52 of the cross members 24 of the articulated quadrilateral 20.

In addition, it should be noted that the middle hinges 28 and side hinges 52, which define the respective middle W-W and side axes Z-Z, are placed above and below the rotation pin 68 of the respective front wheels 10',10" and not completely over it, as occurs in the solutions of the prior art. In other words, in relation to a direction of springing or bumping B-B, parallel to the steering axes S'-S',S"-S", each rotation pin 68 of the front wheel 10',10" is comprised between the middle 28 and side hinges 52 respectively of the upper 24' and lower cross member 24" of the articulated quadrilateral.

This implies that the stiffness of the connection between each wheel 10', 10" and the articulated quadrilateral, comprising the suspension, is a more rigid order of magnitude than happens in the aforementioned solutions of the prior art, helping to make the possibility more remote that an alternating resonance of the front wheels 10', 10" may take over due to braking forces or an asymmetric impact. Consequently the present invention helps overall to provide a vehicle that is lightweight but also safe, precise and that conveys to the driver a feeling of safety at the forecarriage, in that it does not transmit to the user vibrations or flickering on the handlebar.

Furthermore, the positioning of the upper and lower 24', 24" cross members of the articulated quadrilateral in the vertical dimension of the wheels makes it possible to move the barycentre of the forecarriage, and therefore of the vehicle, downwards, improving the dynamic behaviour of the vehicle.

Advantageously, the forecarriage 8 comprises, in correspondence with each stub axle 56, a steering tie-rod 70 mechanically connected to the related stub axle 56 to allow the steering of the stub axle 56 and the relative wheel about the respective steering axes S'-S', S"-S". In particular, said steering tie rod 70 is rotatable about a respective steering axis S'-S', S"-S", and extends from a first to a second anchoring end 72, 74 wherein the first anchoring end 72 is connected to the upper end 60 of the upright 48 and the second anchoring end 74 is connected to the stub axle 56. The second anchoring end 74 is movable with respect to the first anchoring end 72 at least with respect to a springing or bumping direction B-B, parallel to the steering axis S'-S', S"-S", so as to follow the stub axle 56 in a bumping movement parallel to the bumping direction B-B.

As mentioned above, the stub axle 56 of each wheel is supported and guided by a single corresponding upright 48 of said articulated quadrilateral 20.

Each stub axle 56 is mounted on a corresponding upright 48 so as to have at least one degree of freedom with respect to the corresponding upright 48, said at least one degree of freedom comprising a translational motion of the stub axle 56 with respect to the upright 48 parallel to the bumping direction B-B, and/or a rotational motion of the stub axle 56 about said steering axis S'-S', S"-S". The wheel 10, with the relative stub axle 56, moves along a substantially straight trajectory, parallel to the bumping direction B-B.

According to one embodiment, each steering tie-rod 70 is mechanically connected to at least one control rod 76, operationally connected to a handlebar (not shown) of the forecarriage 8.

For example it is possible to provide that the steering tie-rods 70 of each stub axle 56 are connected to a same control rod 76, operationally connected to a handlebar of the forecarriage 8.

According to one embodiment, each steering tie-rod 70 is shaped so as to transmit rotational torque to the respective stub axle 56, to allow the rotation of the stub axle 56 about the respective steering axes S'-S', S"-S". In other words, each steering tie-rod 70 is shaped, fitted or configured so as to transmit or allow steering, i.e. the rotation of the corresponding wheel 10', 10" about the respective steering axes S'-S', S"-S".

According to a possible embodiment, each steering tie-rod 70 comprises a pair of connecting rods 78, 80, hinged to the forecarriage 8 with anchoring hinges 82 arranged in correspondence of the first and second anchoring end 72, 74, and hinged respectively to each other at an intermediate point 84, so as to allow a mutual rotation motion of the connecting rods 78, 80, by changing the distance between said first and second anchoring end 72, 74 as a function of the bumping motion of each stub axle 56.

In other words, the connecting rods 78, 80 can rotate around their respective anchoring ends 72,74 and at the intermediate point in order to accommodate and follow the bumping motion of the stub axle 56 and thus of the wheel.

In particular, the first anchoring end 72 is fixed with the upright 48 with respect to a direction parallel to the direction of bumping or springing B-B, while the second anchoring end 74 is free to translate integrally with the stub axle 56 parallel to said bumping or springing direction B-B, so as to accommodate and follow the bumping motion.

Preferably the anchoring hinges 82 and the hinge on the intermediate point 84 define hinge axes parallel to each other.

According to a possible embodiment, between the connecting rods 78, 80 is interposed a suspension comprising at least one spring 86 and/or a damper 88, so as to influence the bumping motion of the associated stub axle 56.

The spring 86 and the damper 88 can be of any type, shape and size. For example, they can be arranged coaxially to each other, and can be attached at different points of the connecting rods 78,80; also they can be anchored to the respective connecting rods 78,80 by means of joints or hinges so as to follow the rotation of the connecting rods 78,80 during the bumping motion of the stub axle 56.

According to a further embodiment, each steering tie-rod 70 comprises a telescopic rod 90 fixed in correspondence of the first and second anchoring end 72, 74 in such a way as to allow a translation motion of the telescopic rod 90, by changing the distance between said first and second anchoring end 72, 74 as a function of the bumping motion of each stub axle 56.

In other words, the first anchoring end 72 of the telescopic rod 90 is fixed to the upright 48 with respect to a direction parallel to the direction of bumping or springing B-B, while the second anchoring end 74 of the telescopic rod 90 is free to translate integrally with the stub axle 56 parallel to said bumping or springing direction B-B, so as to accommodate and follow the bumping motion.

For example, said telescopic rod 90 comprises a stem 92 and a sheath 94 housing at least partly said stem 92 and is guided by the stem 92 in translation motion parallel to the bumping direction B-B.

According to one embodiment, a suspension is associated to the telescopic rod 90 comprising at least one spring 86 and/or a damper 88, so as to influence the bumping motion of the associated stub axle 56.

According to a further embodiment, each steering tie-rod 70 comprises a leaf spring 96 fixed in correspondence of the first and second anchoring end 72, 74, in such a way as to allow a reciprocal translation motion between the anchoring ends 72, 74, changing the distance between said first and second anchoring end 72, 74 as a function of the bumping motion of each stub axle 56.

For example said leaf spring 96 also realises the suspension of the stub axle 56 with respect to the articulated quadrilateral of the forecarriage 8.

In other words, the leaf spring 96 is able to flex elastically, so as to allow a mutual and controlled displacement between the first and second anchoring ends 72, 74 i.e. so as to allow the bumping motion of the stub axle 56 and of the corresponding wheel 10. In addition, the leaf spring 96 realises the suspension of the stub axle 56 and the relative wheel 10, at least with regard to the elastic part; in other words, the leaf spring 96 realises the elastic spring of the suspension of the wheel 10. In addition, the leaf spring 96 is dimensioned so as to transmit the steering motion to each wheel 10', 10" about the respective steering axis S'-S', S"-S". In other words, the leaf spring 96 is sufficiently stiff to allow the steering motion of the wheel and, at the same time, the respective bumping motion.

Figure 12A:
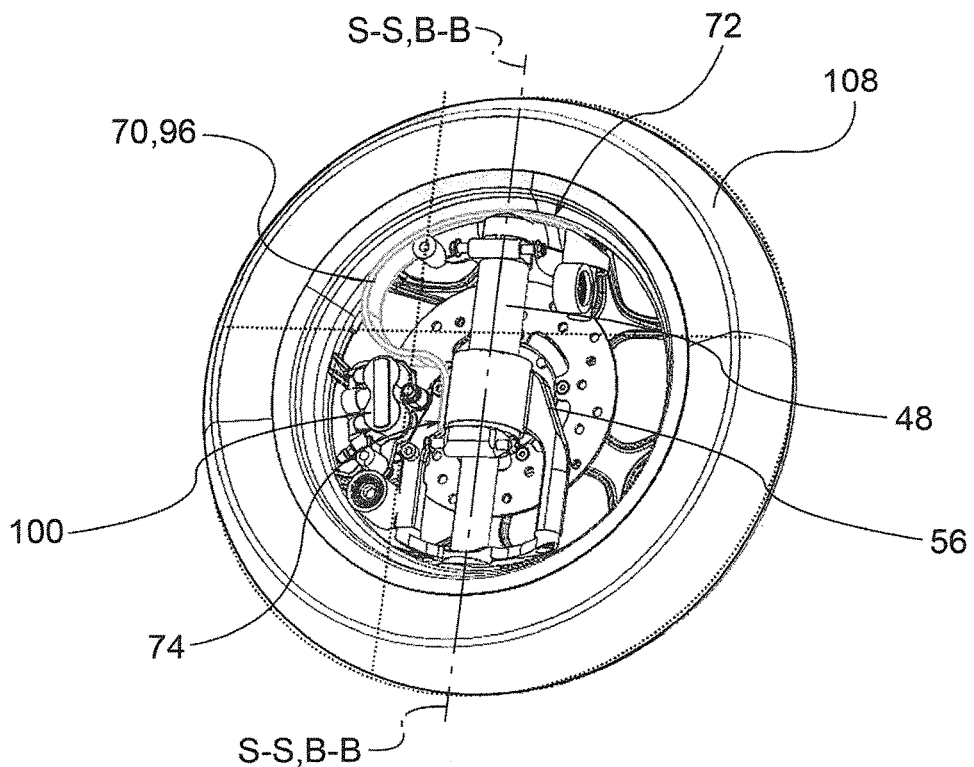
Figure 12B:
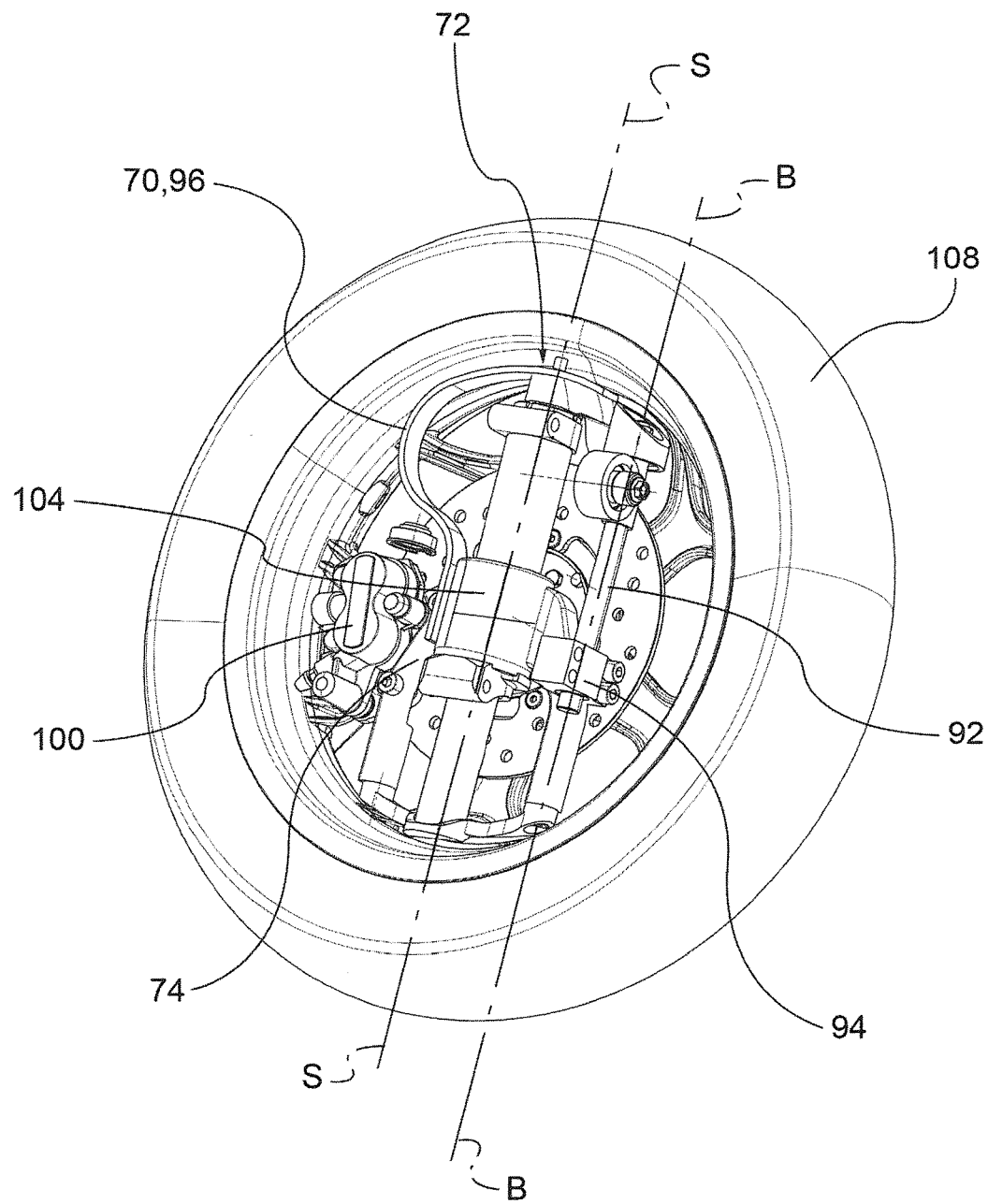

According to a further embodiment (FIG. 12b), said telescopic rod 90 is also placed alongside said leaf spring 96 in order to entrust the former with the main guide function in the bumping motion of the stub axle 56 and to the leaf spring 96 the elastic suspension function.

For example, the leaf spring 96 is shaped overall like a 'C', so that the two ends of the 'C' constitute the first and second anchoring ends 72,74. The chord subtended between said anchoring ends 72,74 represents the distance or wheelbase varying as a function of the bumping motion of the stub axle 56.

For example, in correspondence of internal points, comprised between said first and second anchoring ends 72,74, it is possible to fix a damper 88 and/or an additional spring. For example, the leaf spring 96 is a metallic element or not, curved, composed of a rectangular section bar; said rectangular section has a lesser side directed parallel to the direction of bumping B-B, so as to facilitate the bending of the spring itself, and a greater side directed perpendicularly to the steering axis S'-S', S"-S" so as to oppose sufficient rigidity to the steering motion of the wheel, i.e. so as to transmit the steering motion to the stub axle 56 rigidly, without inducing drifts between the steering angle set by the steering tie rod 70 and the relative kinematic handlebar, and the actual steering angle transmitted to said stub axle 56.

According to one embodiment, the forecarriage 8 comprises brackets 98, each connected to the stub axle 56 of the front wheel 10', 10" and to the steering tie-rod 70 of the forecarriage 8, so as to control the rotation of the stub axles 56 about the respective steering axes S'-S', S"-S" of each front wheel 10', 10".

Preferably, each bracket 98 supports braking means 100 for each front wheel 10', 10".

For example, said braking means 100 comprise a calliper for disc brake arranged astride a brake disc 102 integral in rotation with the front wheel 10', 10".

The bracket 98 extends astride the corresponding upright 48 from the side of the lower end 64 of said upright 48.

For example, the stub axle 56 comprises a sleeve 104 placed coaxially to the upright 48.

According to possible embodiments, between the stub axle 56 and the upright 48 are arranged suspension means of the front wheel 10', 10" wherein said suspension means comprise a spring 86 and/or a damper 88.

For example, the uprights 48 are hollow so as to house internally, at least partially, the suspension means 86, 88 of the front wheel 10', 10".

As known, each front wheel 10', 10" comprises a wheel rim 106 which supports a tyre 108 and that is rotatably supported by the related stub axle 56; preferably the stub axle 56 and the steering tie-rod 70 are at least partially housed in a volume delimited by said wheel rim 106.

Even more preferably the stub axle 56, the steering tie-rod 70 and the upright 48 are integrally housed in said volume delimited by the wheel rim 106.

In a preferred embodiment, each centreline plane of the wheel R'-R', R"-R" goes through the steering axis S'-S', S"-S" of each front wheel 10', 10".

In a further embodiment, an offset or transverse overhang is provided between each steering axle S'-S',S"-S" and the relative centreline plane of the wheel R'-R', R"-R". Such transverse overhang is between 0 and 2 cm, more preferably between 0 and 1 cm, even more preferably said transverse overhang is equal to 0.7 cm.

Preferably, said volume bounded by the wheel rim 106 is facing with respect to a centreline plane M-M of the forecarriage passing through said middle hinges 28. In other words, the stub axles 56 are facing inward towards the centreline plane M-M of the motor vehicle and the relative components associated with the stub axles 56 spindles are not directly visible to an outside observer.

As mentioned above, the vehicle 4 according to the present invention comprises at least one rear drive wheel 14; according to a possible embodiment, the vehicle has two rear drive wheels 14 at the rear axle 12.

For example, in this embodiment, in which the motor vehicle is a quadricycle, the rear drive wheels 14 at the rear axle 12 are connected to each other and to a rear axle frame 13 by means of an articulated quadrilateral 20 as described above in relation to the front wheels 10.

As may be appreciated from the description, the present invention makes it possible to overcome the drawbacks mentioned of the prior art.

In particular, the forecarriage solution has no coupling between the steering motion and the bumping motion of the front wheels.

Consequently, in the case of asymmetrical bumping of the front wheels no divergences between the front wheel planes which would jeopardise the directionality of the vehicle occur. Moreover, thanks to this de-coupling between the steering motion and the bumping motion of the front wheels no steering reactions occur such as to induce rotations to the handlebar, in the case of symmetrical bumping of the front wheels.

Furthermore, the solution presents a particularly contained non-suspended mass since it is constituted solely by the wheel and by its relative stub axle.

The described solution falls within the case of interconnected suspensions since the balance to a load on a front wheel is found with an equal load on the conjugated front wheel; the load transfer occurs through the quadrilateral, and thus by means of its inertia which also involves that of the entire vehicle, and thus presents a delay of an entity related to said inertia.

In practice, the inertia interposed between the paired wheels acts so as to move the solution with interconnected wheels towards one with independent wheels favouring comfort and counteracting any resonance phenomena that could be triggered on the wheels, which would otherwise not be damped.

In addition, as described, the middle hinges and side hinges, which define the respective middle and side axes, are placed above and below the rotation pin of the respective front wheels and not completely over it, as occurs in the solutions of the prior art. This way, with respect to the main extension axis of each upright each rotation pin of the front wheel is comprised between the middle and side hinges respectively of the upper and lower cross member of the articulated quadrilateral. This implies that the stiffness of the connection between each wheel and the articulated quadrilateral, comprising the suspension, is a more rigid order of magnitude than happens in the aforementioned solutions of the prior art, helping to make the possibility more remote that an alternating resonance of the front wheels may take over due to braking forces or an asymmetric impact. Consequently the present invention helps overall to provide a vehicle that is lightweight but also safe, precise and that conveys to the driver a feeling of safety at the forecarriage, in that it does not transmit to the user vibrations or flickering on the handlebar.

Therefore the motor vehicle according to the present invention is able to guarantee not only high stability, superior to that of a motor vehicle with two wheels, thanks to the presence of two paired front wheels, but also remarkable handling and ease of leaning, typical of a motor vehicle with only two wheels.

A person skilled in the art may make numerous modifications and variations to the solutions described above so as to satisfy contingent and specific requirements while remaining within the sphere of protection of the invention as defined by the following claims.

The invention claimed is:

1. Motor vehicle forecarriage comprising
a forecarriage frame,
a pair of front wheels kinematically connected to the forecarriage frame by means of an articulated quadrilateral,
said articulated quadrilateral comprising a pair of cross members, hinged to the forecarriage frame in correspondence of middle hinges,
said cross members being connected together, in correspondence of opposite transverse ends, by means of uprights pivoted to said transverse ends in correspondence of side hinges,
the cross members and the uprights defining said articulated quadrilateral,
wherein
each of the uprights guides and supports a stub axle of a front wheel, each upright extending from an upper end to a lower end,
wherein the left and right uprights rotatably support the left and right front wheels, respectively, around respective steering axes parallel to each other,
wherein each stub axle is mechanically connected to a rotation pin of a front wheel so as to rotatably support the front wheel around a related rotation axis,
wherein
the forecarriage comprises, in correspondence with each stub axle, a steering tie-rod mechanically connected to the related stub axle to allow the steering of the stub axle and the related front wheel about the respective steering axes,
wherein said steering tie-rod is rotatable about a respective steering axis, and extends from a first to a second anchoring end, wherein the first anchoring end is connected to the upper end of the upright and the second anchoring end is connected to the stub axle, said second anchoring end being movable with respect to the first anchoring end at least with respect to a springing or bumping direction, parallel to the steering axis, so as to follow the stub axle in a bumping movement parallel to the bumping direction.

2. Motor vehicle forecarriage according to claim 1, wherein each steering tie-rod is mechanically connected to at least one control rod, operationally connected to a handlebar of the forecarriage.

3. Motor vehicle forecarriage according to claim 1, wherein the steering tie-rods of each stub axle are connected to a same control rod, operationally connected to a handlebar of the forecarriage.

4. Motor vehicle forecarriage according to claim 1, wherein each steering tie-rod is shaped so as to transmit rotational torque to the respective stub axle, to allow the rotation of the stub axle about to the respective steering axes.

5. Motor vehicle forecarriage according to claim 1, wherein each steering tie-rod comprises a pair of connecting rods, hinged to the forecarriage with anchoring hinges arranged in correspondence of the first and second anchoring end, and hinged respectively to each other at an intermediate point, so as to allow a mutual rotation motion of the connecting rods, by changing a distance between said first and second anchoring end as a function of the bumping motion of each stub axle.

6. Motor vehicle forecarriage according to claim 5, wherein the anchoring hinges and a hinge on the intermediate point define hinge axes parallel to each other.

7. Motor vehicle forecarriage according to claim 5, wherein between the connecting rods is interposed a suspension comprising at least one spring and/or a damper, so as to influence the bumping motion the associated stub axle.

8. Motor vehicle forecarriage according to claim 1, wherein each steering tie-rod comprises a telescopic rod fixed in correspondence of the first and second anchoring end in such a way as to allow a translation motion of the telescopic rod, by changing a distance between said first and second anchoring end as a function of the bumping motion of each stub axle.

9. Motor vehicle forecarriage according to claim 8, wherein said telescopic rod comprises a stem and a sheath housing at least partly said stem and is guided by the stem in translation motion parallel to the bumping direction.

10. Motor vehicle forecarriage according to claim 8, wherein to the telescopic rod is associated a suspension comprising at least one spring and/or a damper, so as to influence the bumping motion the associated stub axle.

11. Motor vehicle forecarriage according to claim 1, wherein each steering tie-rod comprises a leaf spring fixed in correspondence of the first and second anchoring end in such a way as to allow a translation motion of the telescopic rod, by changing a distance between said first and second anchoring end as a function of the bumping motion of each stub axle.

12. Motor vehicle forecarriage according to claim 11, wherein said leaf spring realises the suspension of the stub axle with respect to the articulated quadrilateral of the forecarriage.

13. Motor vehicle forecarriage according to claim 11, wherein said leaf spring has an overall "C" shape.

14. Motor vehicle forecarriage according to claim 1, wherein each rotation pin of the front wheel is comprised between the upper end and the lower end of the corresponding upright of the articulated quadrilateral.

15. Motor vehicle forecarriage according to claim 1, wherein each rotation pin of each front wheel is comprised between adjacent side hinges of the cross members of the articulated quadrilateral.

16. Motor vehicle forecarriage according to claim 1, wherein the forecarriage comprises at least one bracket, connected to the stub axle of the front wheel and a steering tie-rod of the forecarriage, so as to control the rotation of the stub axles about the respective steering axes of each front wheel.

17. Motor vehicle forecarriage according to claim 16, wherein said bracket supports braking means for each front wheel.

18. Motor vehicle forecarriage according to claim 17, wherein said braking means comprise a calliper for disc brake arranged astride of a brake disc integral in rotation with the front wheel.

19. Motor vehicle forecarriage according to claim 16, wherein said bracket extends astride the corresponding upright from the side of the lower end of the upright.

20. Motor vehicle forecarriage according to claim 1, in which the stub axle comprises a sleeve arranged coaxially to the upright.

21. Motor vehicle forecarriage according to claim 1, wherein between the stub axle and the upright are arranged suspension means of the front wheel, wherein said suspension means comprise a spring and/or a damper.

22. Motor vehicle forecarriage according to claim 21, wherein said uprights are hollow so as to house internally, at least partially, said suspension means of the front wheel.

23. Motor vehicle forecarriage according to claim 1, wherein each front wheel comprises a wheel rim which supports a tyre and that is rotatably supported by the related stub axle, wherein the stub axle and the steering tie-rod are at least partially housed in a volume delimited by said wheel rim.

24. Motor vehicle forecarriage according to claim 23, wherein the stub axle, the steering tie-rod and the upright are integrally housed in said volume delimited by the wheel rim.

25. Motor vehicle forecarriage according to claim 1, wherein the hinges are parallel to each other and are oriented so that, with respect to a projection plane passing through said middle hinges, the steering axes identify, with the axes of the middle hinge and side hinge, an angle, said angle $\alpha$ being between 80 and 120 degrees.

26. Motor vehicle forecarriage according claim 1, wherein the steering axes, with respect to a projection plane passing through said middle hinges, are inclined by a steering angle between 5 and 20 degrees.

27. Motor vehicle having a drive wheel at the rear axle and a forecarriage according to claim 1.

28. Motor vehicle according to claim 27, wherein the motor vehicle comprises two rear drive wheels at the rear axle.

29. Motor vehicle according to claim 28, wherein said rear drive wheels at the rear axle are connected together and to a rear axle frame by means of an articulated quadrilateral according to claim 1.

* * * * *